Feb. 25, 1936. V. J. CHAPMAN 2,032,260
WIRE FEEDING APPARATUS
Filed Dec. 18, 1934
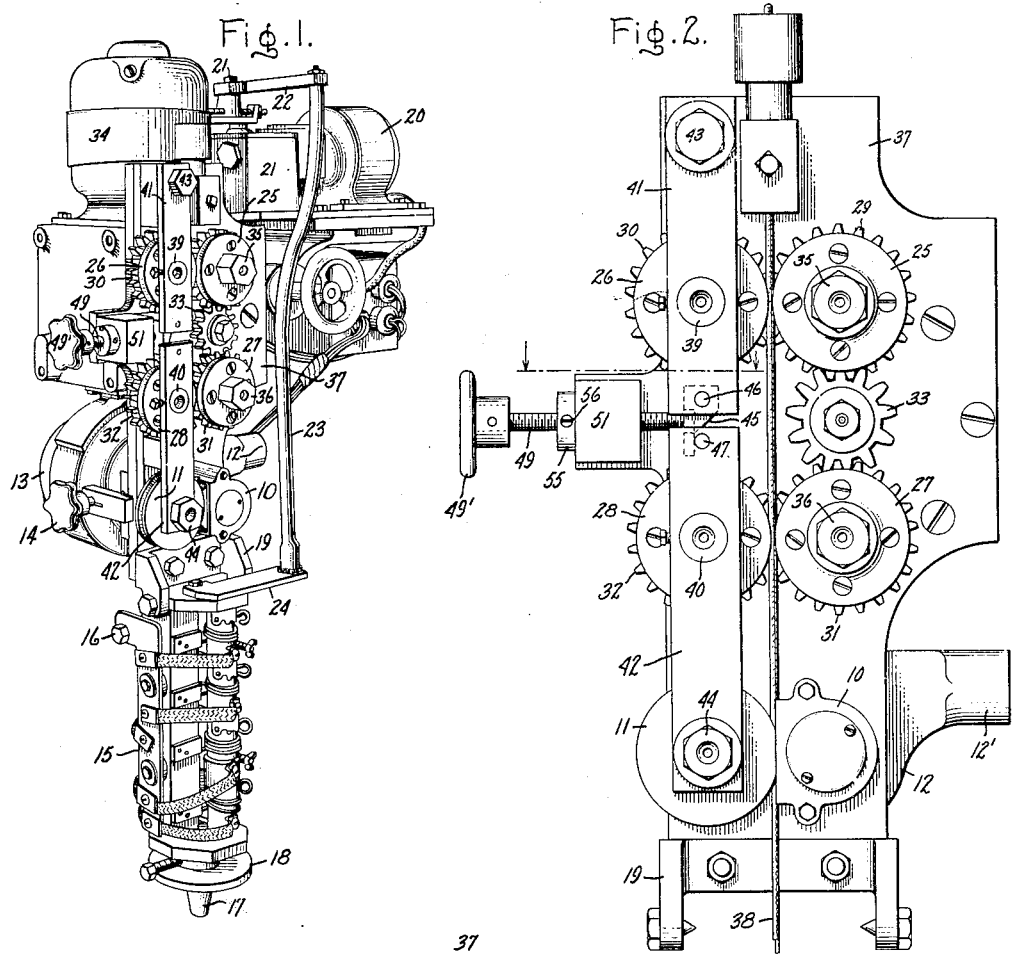
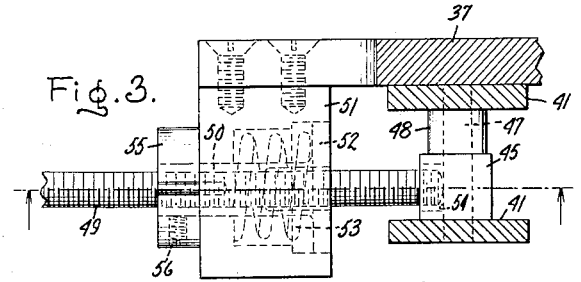
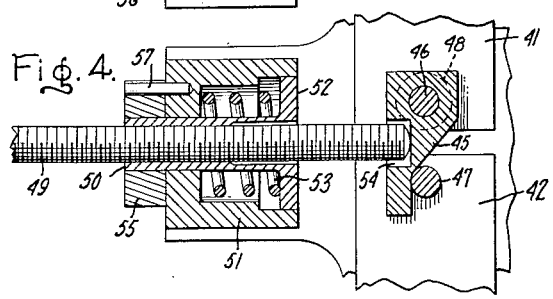
Inventor:
Verni J. Chapman,
by Harry E. Dunham
His Attorney.

Patented Feb. 25, 1936

2,032,260

UNITED STATES PATENT OFFICE 2,032,260

WIRE FEEDING APPARATUS

Verni J. Chapman, Schenectady, N. Y., assignor to General Electric Company, a corporation of New York Application December 18, 1934, Serial No. 758,043

6 Claims. (Cl. 140—128)

My invention relates to apparatus for feeding wire and the like.

More particularly, my invention relates to an electrode feeding mechanism for automatic arc welding machines.

It is an object of my invention to provide an improved feeding mechanism embodying a plurality of pairs of feed rolls.

It is a further object of my invention to provide a feeding mechanism in which the pressures of the several pairs of feed rolls are equalized.

Further objects of my invention will become apparent from the following description taken in connection with the accompanying drawing in which Fig. 1 shows my invention as a part of an automatic arc welding machine; Fig. 2 of which is an enlarged detailed view of the feeding mechanism, and Figs. 3 and 4 of which are views along the section lines of Figs. 2 and 3 respectively illustrating details of the pressure exerting means and equalizer connection.

The automatic arc welding machine illustrated in Fig. 1 is adapted for automatically feeding heavily coated electrodes toward and away from the work to strike and thereafter maintain a welding arc.

As the electrode is fed through the machine a portion of its coating is removed by a milling cutter enclosed within a housing 10, one end of which is closed by a roller 11 which is located opposite the cutter and serves to back up the electrode. This housing is connected to a fan housing 12 which encloses a fan mounted on the same shaft as the shaft upon which the cutter is mounted. The construction is such that the fragments of flux coating removed from the electrode by the cutter are sucked from the housing 10 and discharged by the fan through a conduit 12' which may carry this material to a point remote from the machine.

The shaft upon which the fan and cutter are mounted is rotated by a motor 13 which is pivotally attached to the frame of the welding head. A spring (not shown) tends to rotate the motor 13 about its support in a direction to force the cutter against the electrode. This rotation is limited and the relative positions of cutter and electrode adjusted by means of a stop 14 which is attached to the support for the wire feeding mechanism.

Current is supplied to the electrode by a contact mechanism 15 which is provided with brushes which are biased into engagement with the portion of the electrode laid bare by the cutter above described. This current is supplied to the contact mechanism through a connection made at 16.

The contact mechanism terminates in a nozzle 17 through which the electrode is fed toward the work. A baffle plate 18 is provided at the end of the contact mechanism to protect it against the heat of the welding arc.

The contact mechanism is pivotally attached to the support for the feeding mechanism by means of a bracket 19. It is oscillated about its pivotal support by an oscillating mechanism comprising a motor 20, gearing enclosed within a casing 21, an adjustable crank 21 and connecting rods 22, 23 and 24.

The electrode feeding mechanism comprises a plurality of rolls 25, 26, 27 and 28 each of which is mechanically connected to driven gears 29, 30, 31 and 32. These gears are in a train with a driving gear 33 which is connected through gearing and shafting to the feed motor 34. The feed rolls 25 and 27 and their associated gears 29 and 31 are journaled on axles 35 and 36 which are rigidly mounted on a supporting member 37 on one side of the line along which the electrode 38 is fed. The axles 35 and 36 are in effect bolts whose threaded end portions engage threaded holes in the support 37. The feed rolls 26 and 28 and their associated gears 30 and 32 are journaled on axles 39 and 40 mounted in brackets 41 and 42 opposite the axles 35 and 36 above referred to. These axles are held in place in the brackets by set screws as illustrated.

The brackets 41 and 42 are arranged in alinement with one another along the opposite side of the line of electrode feed and pivotally attached at their remote ends to the support 37 by means of bolts 43 and 44. The bolt 44 also serves as a support for the roller 11 above referred to. The upper bracket 41 is U-shaped and encloses between its arms the feed roll 26 and gear 30. The lower bracket 42 is H-shaped and encloses within its open end portion adjacent the bracket 41 the feed roll 28 and its associated gear 32.

The adjacent ends of the brackets 41 and 42 are connected by an equalizer bar 45 which in the particular embodiment illustrated is pivoted about a pin 46 in the free end of the bracket 41 and engages a pin 47 in the free end of bracket 42. The equalizer bar is properly located on the pin 46 by means of a spacing washer 48.

Resilient means is provided for exerting pressure on each of the brackets through the equalizer bar 45. In the arrangement illustrated this means comprises a screw 49 supported in a sleeve nut 50. This sleeve nut in turn is supported in a block 51 between which and a fixed collar 52 on the sleeve nut is located a spring 53 which acts when compressed to force screw 49 and nut 50 toward the brackets 41 and 42 and into engagement with the equalizer bar 45. The end of the screw 49 fits into a seat 54 in the equalizer bar.

The nut 50 is held in place within its support 51 by means of a detachable collar 55 which is affixed to the nut 50 by a set screw 56. The screw 49 may be turned about its longitudinal axis by means of a hand-wheel 49' and a corresponding rotation of the nut 50 within its support 51 is prevented by a pin 57 one end of which is attached to the support 51 and the other end of which engages a slot in the collar 55. It is thus apparent that by turning the screw 49 a resilient pressure may be applied to the equalizer bar 45 through the agency of the screw 49, and that the pressure means of which the screw forms a part applies an equalized pressure to the feed rolls 26 and 28.

In order to increase the tractive effort of the feed rolls as well as to prevent the destruction of surface coatings on the electrode, these feed rolls may be provided with resilient treads. For example, treads of rubber may be employed. In order to accommodate these resilient treads the feed rolls may be made in two parts. In the construction illustrated the hub and one flange of a feed roll is made integral and the other flange of the feed roll is detachable and affixed to the part comprising the hub and other flange by means of the screws shown in the drawing.

In the arrangement illustrated means have been provided for lubricating the axles 35, 36, 39, 40 and 44. These axles are provided with a longitudinal bore which terminates in a connection adapted to accommodate the terminal of a grease-gun. Radial openings in the axles communicate with the longitudinal bores and supply the lubricant to the bearing surfaces between the axles and the gears and rolls supported thereon.

In the arrangement illustrated two pairs of feed rolls have been employed for feeding the electrode. It is, of course, apparent that a greater number of pairs of feed rolls may be employed without departing from the spirit and scope of my invention.

The welding apparatus above illustrated and described comprising means for feeding a coated electrode, means for producing in the coating of said electrode a longitudinal opening exposing said electrode, and means adapted to extend through said opening for connecting said electrode to a source of welding current is the invention of Lionel G. Pickhaver and William W. Worley, whose application, Serial No. 611,858, was filed May 17, 1932.

The particular contact mechanism illustrated at 15 in Fig. 1 of the drawing is the invention of Joseph H. Cooper, whose application, Serial No. 633,648, filed September 17, 1932 has since matured into Patent 1,992,859 granted February 26, 1935.

Both of the above referred to applications are assigned to the same assignee as the present application.

What I claim as new and desire to secure by Letters Patent in the United States is:

1. Apparatus for feeding wire and the like comprising a support, a plurality of brackets pivotally attached to said support, a plurality of axles rigidly mounted on said support, a plurality of axles mounted on said brackets opposite said axles mounted on said support, feed rolls journaled on said axles, means for positively rotating each of said feed rolls, resilient means for applying pressure to each bracket at a point laterally displaced from its point of pivotal attachment to said support, and means engaging said pressure applying means and said brackets for equalizing the pressures applied to said feed rolls in said brackets by said pressure applying means.

2. A wire feeding mechanism comprising a support, a plurality of axles rigidly mounted on said support on one side of the line of wire feed, a plurality of brackets located on the opposite side of the line of wire feed and alined therewith, means for pivotally attaching the remote ends of adjacent brackets to said support, an axle mounted on each of said brackets opposite one of said axles mounted on said support, feed rolls journaled on said axles, means for positively rotating each of said feed rolls, resilient means for applying pressure to the adjacent free end portions of said brackets, and means engaging said pressure applying means and said brackets for equalizing the pressure applied to said feed rolls in said brackets by said pressure applying means.

3. Apparatus for feeding wire and the like comprising a support, a plurality of axles rigidly mounted on said support, a plurality of brackets pivotally attached to said support, a plurality of axles mounted on said brackets opposite said axles mounted on said support, feed rolls journaled on said axles, a gear train including a driving gear and driven gears each one of which is connected to one of said feed rolls and journaled on the same axle as the feed roll with which it is connected, resilient means for applying pressure to each bracket at a point laterally displaced from its point of pivotal attachment to said support, and means engaging said pressure applying means and said brackets for equalizing the pressures applied to said feed rolls in said brackets by said pressure applying means.

4. A wire feeding mechanism comprising a support, a plurality of alined axles rigidly mounted on said support on one side of the line of wire feed, a plurality of alined brackets pivotally attached to said support along the opposite line of the wire feed, an axle mounted in each of said brackets opposite one of said axles mounted on said support, feed rolls journaled on said axles, a gear train including a driving gear and driven gears each one of which is connected to said feed rolls and journaled on the same axle as the feed roll with which it is connected, a sleeve nut, a screw supported in said nut and having an end portion extending toward said brackets, a support for said nut, means for rotating said screw, means for preventing relative rotation between said nut and said support, resilient means between said nut and said support acting when compressed to force said screw and nut toward said brackets, and an equalizer bar engaging the adjacent free ends of said brackets and having a seat therein for the end of said screw.

5. A wire feeding mechanism comprising a support, two axles rigidly mounted on said support on one side of the line of wire feed, two brackets located on the opposite side of the line of wire feed and alined therewith, means for pivotally attaching the remote ends of said brackets to said support at points beyond the points of support of said axles mounted on said support, an axle mounted on each of said brackets opposite one of said axles mounted on said support, feed rolls journaled on said axles, a gear train including a driving gear and driven gears each one of which is connected to said feed rolls and journaled on the same axle as the feed roll with which it is connected, a sleeve nut, a screw supported in said nut and having an end portion extending toward said brackets, a support for said nut, means for rotating said screw, means for preventing relative rotation between said nut and said support, a compression spring between said nut and said support acting when compressed to force said screw and nut toward said brackets, and an equalizer bar engaging the free ends of said brackets and in the path of movement of the end of said screw.

6. A wire feeding mechanism comprising a support, two axles rigidly mounted on said support on one side of the line of wire feed, two brackets located on the opposite side of the line of wire feed and alined therewith, means for pivotally attaching the remote ends of said brackets to said support at points beyond the points of support of said axles mounted on said support, an axle mounted on each of said brackets opposite one of said axles mounted on said support, feed rolls journaled on said axles, a gear train including a driving gear and driven gears each one of which is connected to said feed rolls and journaled on the same axle as the feed roll with which it is connected, a sleeve nut, a screw supported in said nut and having an end portion extending toward said brackets, a support for said nut, means for rotating said screw, means for preventing relative rotation between said nut and said support, a compression spring between said nut and said support acting when compressed to force said screw and nut toward said brackets, and an equalizer bar pivoted to the free end of one of said brackets, engaging a pin in the free end of the other of said brackets and having a seat therein for the end of said screw.

VERNI J. CHAPMAN.